US009113176B2

United States Patent
Ramos et al.

(10) Patent No.: US 9,113,176 B2
(45) Date of Patent: Aug. 18, 2015

(54) NETWORK AND DEVICE AWARE VIDEO SCALING SYSTEM, METHOD, SOFTWARE, AND DEVICE

(75) Inventors: Naomi Ramos, La Jolla, CA (US); Sujit Dey, San Diego, CA (US)

(73) Assignee: The Regents of the University of California, Oakland, CA (US)

(*) Notice: Subject to any disclaimer, the term of this patent is extended or adjusted under 35 U.S.C. 154(b) by 1441 days.

(21) Appl. No.: 12/674,814

(22) PCT Filed: Aug. 29, 2008

(86) PCT No.: PCT/US2008/010276
§ 371 (c)(1),
(2), (4) Date: Feb. 17, 2011

(87) PCT Pub. No.: WO2009/032214
PCT Pub. Date: Mar. 12, 2009

(65) Prior Publication Data
US 2011/0149145 A1  Jun. 23, 2011

Related U.S. Application Data

(60) Provisional application No. 60/966,754, filed on Aug. 29, 2007.

(51) Int. Cl.
*H04N 7/01* (2006.01)
*H04N 21/2343* (2011.01)
(Continued)

(52) U.S. Cl.
CPC ... *H04N 21/23439* (2013.01); *H04N 21/23805* (2013.01); *H04N 21/2402* (2013.01);
(Continued)

(58) Field of Classification Search
CPC .............. H04N 21/23805; H04N 21/2402; H04N 21/2405; H04N 21/25833; H04N 21/2662; H04N 21/6582; H04N 21/44029; H04N 21/64792
USPC .......... 709/246, 247, 231, 232; 370/229–234, 370/310, 328, 431–437, 464, 465; 348/441, 348/37.003
See application file for complete search history.

(56) References Cited

U.S. PATENT DOCUMENTS 6,205,143 B1 * 3/2001 Lemieux ................. 370/395.61
6,501,441 B1 * 12/2002 Ludtke et al. ............. 345/1.1
(Continued)

FOREIGN PATENT DOCUMENTS

KR    10 1999 001583    1/1999
KR    10 2002 0013983   2/2002
(Continued)

OTHER PUBLICATIONS
Liebel, G., et al., "Advanced Wireless Multiuser Video Streaming Using the Scalable Video Coding Extensions of H.264/MPEG4-AVC", ICME 2006, (2006), pp. 625-628.
(Continued)

*Primary Examiner* — Alina N Boutah
(74) *Attorney, Agent, or Firm* — Greer, Burns & Crain, Ltd.

(57) ABSTRACT

A method of communication is provided according to embodiments of the present invention. A request is received for video data for each of a plurality of devices. For each of the wireless devices, performance capability of the device, and optionally network information, is obtained. A video scalability level for the video data for each of the devices is determined based on the obtained performance capability, and optionally the network information. The video data for each of the devices is scaled according to the determined video scalability level, and the scaled video data is delivered to each of the devices.

13 Claims, 9 Drawing Sheets

(51) Int. Cl.
*H04N 21/238* (2011.01)
*H04N 21/24* (2011.01)
*H04N 21/258* (2011.01)
*H04N 21/2662* (2011.01)
*H04N 21/4402* (2011.01)
*H04N 21/647* (2011.01)
*H04N 21/658* (2011.01)
*H04L 12/413* (2006.01)

(52) U.S. Cl.
CPC ..... *H04N21/2405* (2013.01); *H04N 21/25833* (2013.01); *H04N 21/2662* (2013.01); *H04N 21/44029* (2013.01); *H04N 21/64792* (2013.01); *H04N 21/6582* (2013.01)

(56) References Cited

U.S. PATENT DOCUMENTS

| | | | | |
|---|---|---|---|---|
| 6,788,660 | B1* | 9/2004 | Agrawal et al. | 370/331 |
| 7,016,668 | B2* | 3/2006 | Vaidyanathan et al. | 455/418 |
| 8,307,200 | B2* | 11/2012 | Tanizawa et al. | 713/152 |
| 2002/0131415 | A1* | 9/2002 | Guven et al. | 370/394 |
| 2002/0184304 | A1* | 12/2002 | Meade et al. | 709/203 |
| 2003/0103563 | A1* | 6/2003 | Amini et al. | 375/240.03 |
| 2004/0028138 | A1* | 2/2004 | Piche et al. | 375/240.19 |
| 2005/0129052 | A1* | 6/2005 | Hurwitz et al. | 370/445 |
| 2005/0201287 | A1* | 9/2005 | Welborn | 370/235 |
| 2005/0226196 | A1* | 10/2005 | Suh | 370/338 |
| 2005/0281404 | A1* | 12/2005 | Yu | 380/28 |
| 2006/0146194 | A1* | 7/2006 | Lee et al. | 348/582 |
| 2006/0256130 | A1* | 11/2006 | Gonzalez | 345/619 |
| 2006/0282542 | A1* | 12/2006 | Pinckney et al. | 709/231 |
| 2007/0291038 | A1* | 12/2007 | Herz et al. | 345/501 |
| 2008/0034096 | A1* | 2/2008 | Tourzni et al. | 709/227 |
| 2008/0075095 | A1* | 3/2008 | Suryanarayana et al. | 370/401 |
| 2008/0089422 | A1* | 4/2008 | Karczewicz | 375/240.23 |
| 2008/0095124 | A1* | 4/2008 | Ramos et al. | 370/336 |
| 2008/0181298 | A1* | 7/2008 | Shi et al. | 375/240.03 |
| 2009/0198992 | A1* | 8/2009 | Rofougaran | 713/2 |
| 2009/0245274 | A1* | 10/2009 | Hurwitz et al. | 370/445 |
| 2010/0275249 | A1* | 10/2010 | McCann et al. | 726/5 |
| 2011/0013540 | A1* | 1/2011 | O'Mahony | 370/254 |
| 2012/0014434 | A1* | 1/2012 | Hong et al. | 375/240.02 |

FOREIGN PATENT DOCUMENTS

WO WO 02/056563 7/2002
WO WO 2005/050346 6/2005

OTHER PUBLICATIONS

Reichel, J., et al., "Scalable video coding—Joint draft 6, JVT-S201", Geneva, Switzerland, (Apr. 2006), 529 pages.

Van Der Scharr, M., et al., "Optimized Scalable Video Streaming over IEEE 802.11a/e HCCA Wireless Networks under Delay Constraints", IEEE Transactions on Moblie Computing, vol. 5, No. 6, (Jun. 2006), pp. 755-768.

Vetro, a., et al., "Video Transcoding Architecture and Techniques: An Overview", IEEE Signal Processing Magazine, vol. 20, No. 2, (Mar. 2003), pp. 18-29.

Wang, Ye-Kui, et al., "System and Transport Interface of H.264/AVC Scalable Extension", ICIP 2006, (2006), pp. 165-168.

* cited by examiner

NETWORK AND DEVICE AWARE VIDEO SCALING SYSTEM, METHOD, SOFTWARE, AND DEVICE

PRIORITY CLAIM

This application claims priority of U.S. Provisional Application Ser. No. 60/966,754, filed Aug. 29, 2007.

TECHNICAL FIELD

A field of the invention is data communications, particularly data communications including video delivery. Example applications of the invention include video delivery over wireless networks.

BACKGROUND ART

The number of devices that can support multimedia content over networks, such as but not limited to wireless networks, is increasing significantly. With devices ranging from cellular phones to wirelessly enabled televisions and other devices, there is a challenge faced by content service providers to support multimedia delivery for a diverse set of devices. Perhaps the most significant challenge for multimedia delivery is the delivery of video data (video) due to the amount of information typically involved. For example, devices requesting multimedia data over wireless networks may vastly differ in terms of capabilities, such as screen resolution, supported frame rate, as well as supported bit rate. Content service providers are now faced with the challenging problem of enabling seamless and efficient delivery of video content to viewers using different platforms.

Some prior techniques that scale video for delivery encode and store various versions of the video at the server a priori and send the prepared video stream based on device capabilities. Another method is to use transcoding techniques to decode and re-encode the video before delivery. While both of these schemes can be supported currently, the increasing availability of video content and the greater diversity in device capabilities will make it difficult to continue using these methods in future video communication systems. Methods that store multiple versions at the server end suffer from the major drawbacks of needing significant content management and storage space. Transcoding techniques are costly in terms of the number of servers needed to support quick decoding and re-encoding of each video stream.

An alternative to these delivery systems includes recent work in scalable video coding. Recently, significant strides have been made in this area in improving coding efficiency and reducing decoder complexity. Such efforts have made scalability more feasible, and recent video standards have included some scalability features, such as quality scalability using fine-grained scalability in MPEG4, and well as spatio-temporal scalability in H.264/AVC, among other standards. These developments have provided the motivation for the Joint Video Team (JVT) to develop and standardize a more powerful video codec, the H.264/AVC Scalable Video Coding (SVC) Extension. This SVC Extension is a layered video codec that provides bit-stream scalability and allows video to be encoded once at the server in such a way that various scaled streams can be extracted and decoded from the single stream, without the need for re-encoding the video. Building on scaling techniques in previous video standards, SVC makes it possible to extract video scaled in multiple dimensions: spatial, temporal, and quality.

Although SVC provides a notable advantage over previous video standards, the penalty for this scalability comes in terms of the network delivery costs. Particularly, SVC may provide a solution by enabling devices with suitable techniques to extract video streams scaled to match their capabilities. However, SVC can be significantly bandwidth inefficient. Particularly, with SVC, the entire stream, allowing for video extraction at the highest possible quality, is sent over the network without regard for the capabilities of each receiving device. The present inventors have noted that by sending the highest possible quality stream over the network, irrespective of the capabilities of the end-devices and the network (including the network conditions), SVC can limit the number of devices being served and reduce the network's average quality satisfaction. Additionally, there is a cost for each device for processing and receiving the additional scalability layers unnecessarily, in terms of energy, processing power, and memory.

DISCLOSURE OF THE INVENTION

A method of communication is provided according to embodiments of the present invention. A request is received for video data for each of a plurality of devices. For each of the devices, performance capability of the device, and optionally network information, is obtained. A video scalability level for the video data for each of the devices is determined based on the obtained performance capability and optionally the network information. The video data for each of the devices is scaled according to the determined video scalability level, and the scaled video data is delivered to each of the devices.

BEST MODE OF CARRYING OUT THE INVENTION

Figure 1:
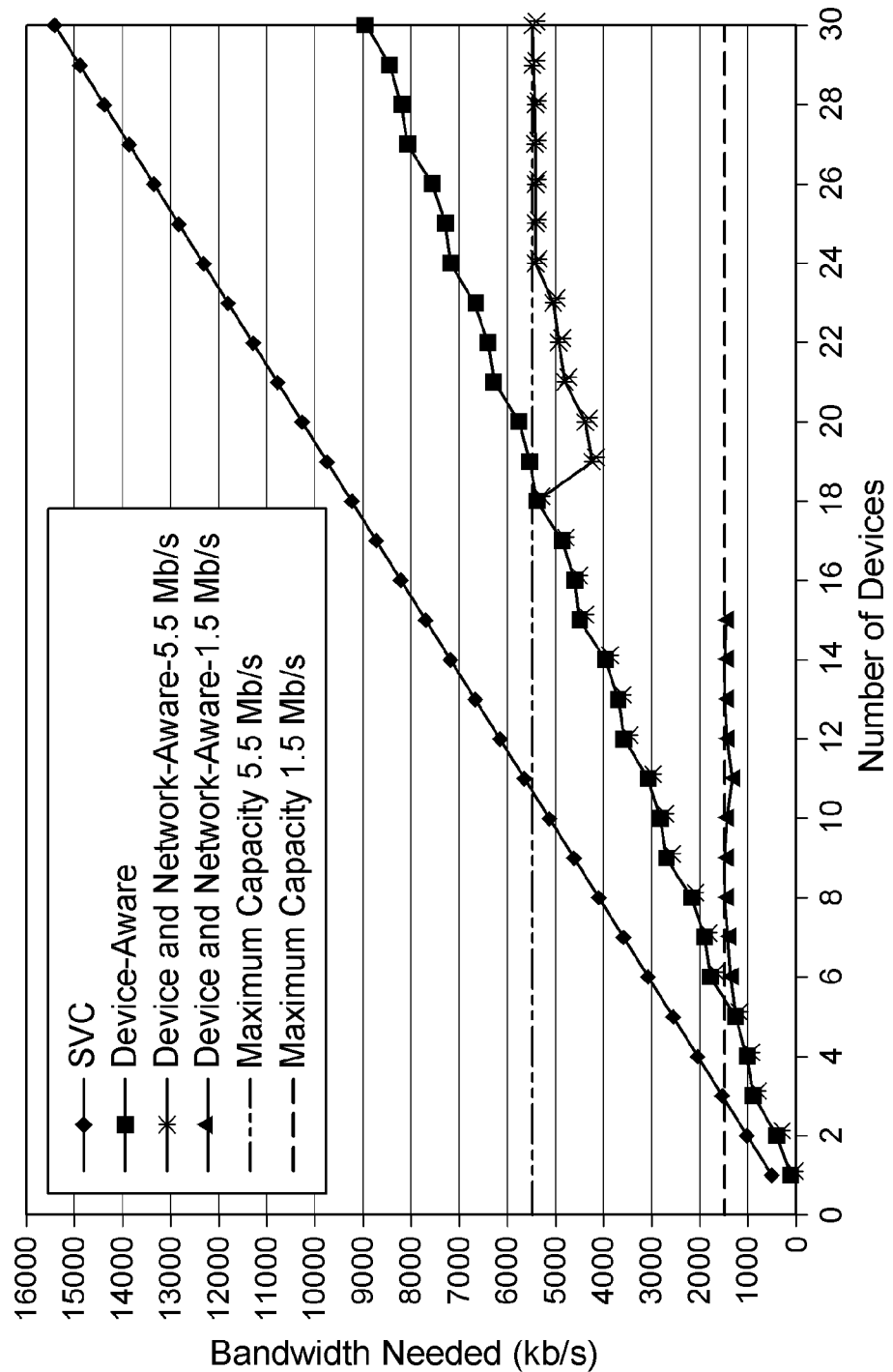
FIG. 1 shows bandwidth efficiency for scalable video coding (SVC) and under example methods of the present invention for distributing video data to a plurality of devices.

As opposed to video delivery methods and devices in the prior art, embodiments of the present invention take advantage of benefits of scaling based on device information as well as network information. Additionally, example embodiments of the present invention can make decisions in terms of an entire network and decide the appropriate scalability level for all of the users in the network based on network capacity and user limitations. Embodiments of the present invention can be used with scalability in the transport and link layers, addressing error concealment and appropriate network parameters, for robustness, and for improved delivery.

A device and network-aware scaling framework according to example embodiments of the present invention provides efficient delivery of scalable video over networks. Based on device capabilities, network capacity, user channel information, and the desired service objective, a framework according to embodiments of the present invention determines the suitable scaling level for each stream. Different sets of video scaling schemes are provided according to embodiments of the present invention, including user device-centric and network cooperative. In the user device-centric scaling scheme, the example framework considers only the needs of the individual user device and has the objective of providing the best quality video solely based on a user device's capabilities. With the network cooperative schemes, the objective is to improve overall network efficiency, and therefore improve the aggregate quality of the users, rather than simply meeting individual user requirements. Hence, example embodiments of the present invention consider the requests of all the devices and uses known information about the network, such as capacity or individual user channel limitations, prior to making a decision on the scalability levels. By performing the appropriate scaling prior to video delivery over the network, example embodiments of the present invention are able to retain the advantages of SVC of using a single-encoded stream, but are also able to increase bandwidth efficiency, support a greater number of simultaneous users, and improve quality satisfaction.

Further, in comparison to SVC, example embodiments of the present invention allow the appropriate scaling to be made prior to delivery over the networks. Thus, rather than simply putting the burden on the network and devices, example methods of the present invention can be used to avoid inefficient bandwidth use and avoid the delivery and processing cost of including unusable layers unnecessarily.

An embodiment of the invention is a method for scaling video based on device and network capacity information. Methods of the invention conduct scaling prior to delivery to devices based on device capabilities, network capacity, and desired service objectives, and are therefore able to improve quality satisfaction and to increase bandwidth efficiency.

Another embodiment of the invention is a device and network-aware scaling method. Based on device capability information, network capacity, and a desired service objective, an example method finds the suitable scaling level for each video stream prior to its delivery over the network. Various video scaling algorithms may be used. One example scaling algorithm conducts scaling based on device limitations, while another determines scaling using network-capacity information and device constraints. Simulations of example embodiments have demonstrated improved quality satisfaction, increased bandwidth efficiency, and the ability to satisfy a greater number of clients simultaneously.

A preferred embodiment system for implementing network and device aware video scaling methods of the invention provides a framework as part of a network, disposed between a server and at least one device, at any of various points in the network. An example framework includes a scalable video network and device monitor, a video characteristics source, and a video scaling controller and extractor. The network and device monitor gathers information about the capabilities of the devices (such as, but not limited to, supported resolution, frame rate, and/or bit rate for receiving and/or processing), determines which videos are being requested by each device, and obtains the available bandwidth of the network.

The video characteristics source component receives the video stream and provides information regarding the video stream to the video scaling controller and extractor. As a nonlimiting example, for each video stream in the network, the video characteristics source component determines a set of enumerated scalability profiles. Each of these profiles represents a scalability level determined by a spatial, temporal, and bit rate combination.

For a new set of incoming devices, the received and monitored inputs are used by the video scaling controller and extractor to determine the scaling level for each of the devices based on a video scaling algorithm. The scaling levels chosen are dependent on the algorithm's desired service objective. The video scaling controller and extractor then scales the received video based on the determined scaling level, and delivers (directly or indirectly) the scaled video to the requesting devices.

Various video scaling algorithms for the video scaling controller are provided according to embodiments of the present invention. One example video scaling algorithm is a device-aware scaling algorithm. The service objective of this algorithm is to maximize individual quality for devices given device capability constraints obtained from the network and device monitor.

Another example video scaling algorithm has the goal of maximizing the overall quality satisfaction of the network given network and device constraints. This scaling algorithm considers a quality satisfaction function Q that relates experienced quality to required quality and can also be weighted by an individual device's priority or experienced channel conditions. The constraints of the above objective are to: 1) maintain a minimum quality requirement; 2) ensure that the bandwidth allocated does not exceed the overall network bandwidth; and 3) choose a profile that does not exceed what can be supported by the device. The algorithm uses an iterative approach to meet this objective and constraints.

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

Example methods and systems of the present invention can be used in conjunction with video encoded using SVC and examples herein are described using SVC encoded video, though the invention is not to be limited to this particular type of scalable video. However, as opposed to using full SVC streams, example methods of the present invention scale are based on device information and make decisions for all devices in the network in network-cooperative schemes.

While SVC provides many advantages in terms of scalability, it can be significantly bandwidth inefficient. As an example, consider a scenario where a video stream is being requested over a wireless network by a set of devices. For simplicity and clarity, an equal distribution of three possible devices is considered: a laptop, a personal digital assistant (PDA), and a cellular phone with capabilities that limit viewing quality to a resolution, frame rate (frames per second), and bit rate (kb/s) of Common Intermediate Format (CIF) 30-512, CIF 15-256, and Quarter CIF (QCIF) 15-128 respectively. A testing video, BUS, is streamed.

With SVC, the video stream is encoded once at the server, such that the maximum quality level can be extracted from the stream by the receiving device. In this scenario, the BUS video is encoded and sent to each device so that the maximum scalability level (CIF 30-512) can be extracted, irrespective of the device's capabilities. FIG. 1 shows an example bandwidth usage of this method. Note that the bandwidth needed with SVC increases linearly with the number of devices in the network. If a basic admission control scheme is used to limit the number of devices based on the required bandwidth, the network can only support a limited set of devices with SVC. For example, in a network with an application layer throughput limit of 5.5 Mb/s, such as in an 802.11b network, only 10 devices can be supported with SVC. Similarly, in a cellular network with a 1.5 Mb/s application layer throughput limit, only 2 devices can be supported simultaneously in a cellular site.

In an example scenario according to embodiments of the present invention, a system would receive a request from the devices, determine the suitable video stream, and scale the requested video stream based on a video scaling scheme prior to sending over the network. Video scaling schemes are provided according to embodiments of the present invention. In a user device-centric scheme, the example system considers only the needs of the individual user device. For example, if the laptop and cellular phone made requests for video streams, the example framework would consider the scaling of the laptop and phone independently with this scaling scheme. On the other hand, in a network cooperative scheme, an example embodiment would consider the requests of all the devices in the network prior to making a decision in scaling the video stream.

The bandwidth usage of a user device-centric video scaling algorithm is presented in FIG. 1, labeled as "device-aware". Prior to sending the video over the wireless network, the algorithm extracts a scaled video stream matching the maximum capabilities of each device. In this scenario, the laptop would be sent the full CIF 30 video, while the phone would be sent the QCIF 15 video. As seen in FIG. 1, the device-aware scheme achieves significant improvement over SVC, with up to a 42% reduction of bandwidth usage in the case of 30 devices. Additionally, the device-aware scaling algorithm increases the number of devices that can be supported, from 10 devices with SVC to 18 devices given the application throughput limit of 5.5 Mb/s. In the case of 1.5 Mb/s, the device-aware scheme is able to increase the number of supported devices from 2 to 5 devices.

With the device-aware scheme, the scaling is performed based solely on device limitations. Next is considered a network cooperative scheme where the example framework uses network information, such as network capacity, to determine the appropriate scaling levels for each device in the network. The device and network capacity-aware scaling algorithm focuses on maximizing quality satisfaction, while improving bandwidth efficiency and supporting a greater number of users. The results with this example scaling algorithm can be seen in FIG. 1, labeled as "device and network-aware". Bandwidth usage is reduced by 64% in the case of 30 devices compared to SVC. Additionally, the device and network capacity-aware scaling algorithm increases the number of simultaneous video users by three times, from 10 devices with SVC to 30 given a 5.5 Mb/s application throughput limit. With a 1.5 Mb/s limit, one can increase the number of users from 2 to 15 devices.

As can be seen by this example, embodiments of the present invention can be used to increase the number of clients supported in a given network. Additionally, such embodiments are able to improve the aggregate quality satisfaction by three times in comparison to SVC in the comparison of 30 devices.

Figure 2:
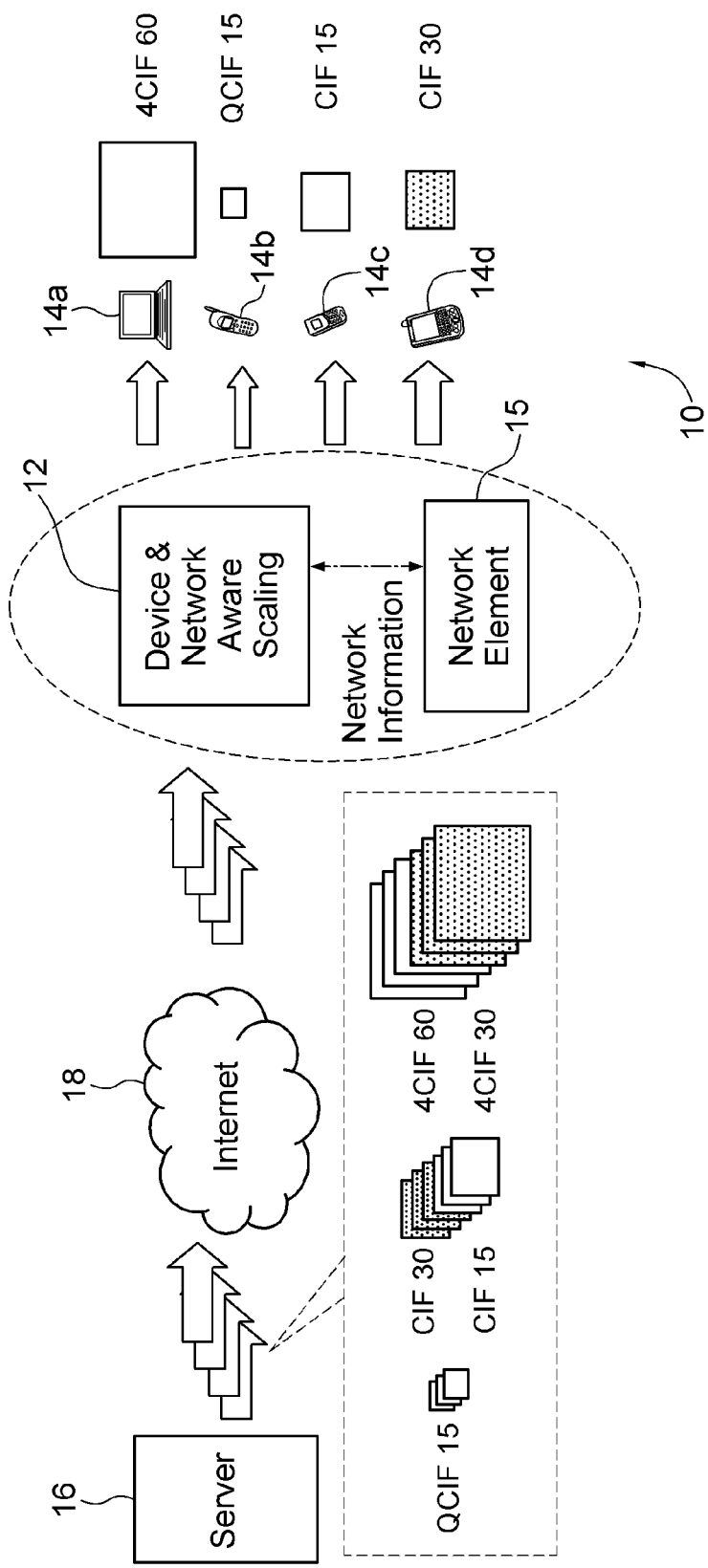
FIG. 2 shows an example placement of the device and network aware video scaling framework in a network according to an embodiment of the present invention.

A more particular example system will now be described with reference to FIG. 2. To perform the scaling prior to sending video over a network 10 such as but not limited to a local area network (LAN), a framework 12 is located such that it can access information about the network, one or more devices 14a-14d, and application. As a nonlimiting example, the framework 12 can be placed in a server, a proxy-type device on the edge of the wireless network 10, or on an appropriate network element, such as but not limited to a high-end access point (AP) 15, as shown in FIG. 2. The server, proxy-type device or network element may be embodied in, for example, any suitable device, such as but not limited to, a network device and/or a computing device that is configurable via software, firmware, and/or hardware to perform methods of the present invention. The framework 12 may alternatively be embodied in a device separate from, but in communication with a server, network element, or proxy-type device. The framework 12 may be embodied in a single device, or in separate devices. Example devices embodying the framework 12 may include, as a nonlimiting example, communication components (e.g., antenna, signal processing components, etc.), a processor, memory, storage, power supply, and/or input/output components. Further, the present invention may also be embodied in software, delivered via any suitable media or propagated signal, that includes instructions that when read cause a device to perform video scaling according to methods of the present invention. The invention further includes any device hardware or firmware (native or later added) that allows a device to perform video scaling according to embodiments of the present invention. A network including one or more devices (e.g., such as devices 14a-14d) and a framework (e.g., such as framework 12) is also to be considered an embodiment of the present invention. It will also be understood that, although a wireless network is used in certain example embodiments of the present invention, the invention is not to be limited to wireless networks, but can instead be applied to any network and applied to or embodied in any network-enabled device.

Clients, such as the devices 14a-14d, make requests to a server 16 for a given video, and the framework 12 intercepts these requests from the server over the Internet 18 and obtains the scalable video stream from the appropriate server. The example framework 12 uses the SVC video stream, scalability property information, and network bandwidth limitations to determine the appropriate scaling for each of the devices.

Figure 3:
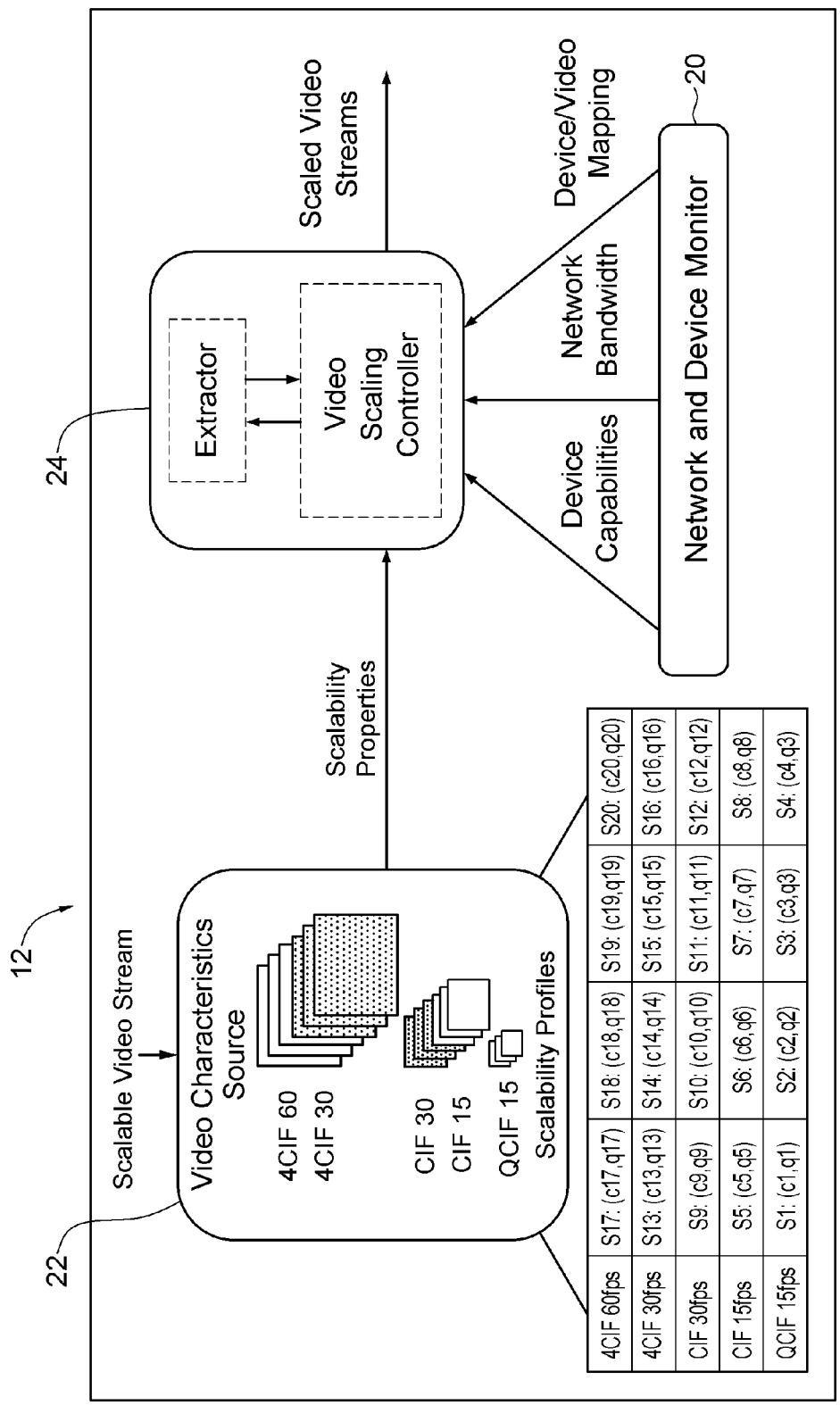
FIG. 3 shows an example video scaling framework according to an embodiment of the present invention.

Referring to FIG. 3, an example framework 12 includes three principal components: a network and device monitor 20, a video characteristics source 22, and a video scaling controller and extractor 24. FIG. 3 shows these components 20, 22, 24 and their interactions with one another. Though these components 20, 22, 24 may be part of a single device, this is not necessary, as the components may instead be split among multiple devices.

The network and device monitor 20 gathers information about the capabilities of the devices 14a-14d, determines which videos are being requested by each device, and obtains network information, such as but not limited to the available bandwidth of the network 10. To determine the network information, the network and device monitor 20 either queries the network element 15 to determine the number of devices or directly obtains current channel information from individual devices 14a-14d to estimate the current network bandwidth available. Example methods for directly obtaining the current channel information from individual devices include passively monitoring the link or actively sending packets to determine link throughput. Obtaining network information from the network element provides, for example, information regarding the number of devices 14a-14d that are contending for the network element site (or sector, or cell site, etc.), so that video data delivery can be optimized either for individual devices or the entire network. Obtaining the network information from the devices 14a-14d directly allows device scaling targeted towards that specific device(s), and thus enabling an optimum video for that device, but is less suitable for optimizing the throughput/number of devices for the entire network. It will be appreciated that other methods of obtaining network information may be used, and the present invention is not to be limited to methods using a particular type of technique for obtaining network information.

For the device information, the monitor 20 in an example embodiment first determines what type of device is requesting the video stream. The device type can be discovered during the Real Time Transport Protocol/Real Time Streaming Protocol (RTP/RTSP) handshake, as a nonlimiting example. The mapping between the device and the video is sent to the video scaling controller and extractor 24. The next example step for the monitor 20 is to perform a device lookup, such as but not limited to a lookup in a Wireless Universal Resource File (WURFL) database and obtain information about the device capabilities, e.g., maximum supported resolution, frame rate, and bit rate. It will be appreciated that other methods of obtaining device information may be used, and the present invention is not to be limited to methods using a particular type of technique for obtaining device information.

The video characteristics source component 22 receives the video stream, for example from the server 16, and provides information about the stream to the video scaling controller and extractor 24. This may be done by any suitable method. For each video stream in the network 10, the component 22 determines the scalability features and range available with the given video stream. The scalability features can include, but are not limited to, spatial, temporal, and quality scalability, as seen, as a nonlimiting example, in SVC-encoded videos.

After understanding the scalability features, the video characteristics source component 22 inspects the stream and identifies the step size for the different axis of scalability. For example, as illustrated in FIG. 3, the video characteristics source component 22 has identified spatial scalability in the video stream allowing for 4 CIF, CIF, and QCIF video, a temporal size of 15, 30, and 60 fps, and four potential bit-rates given a spatial/temporal combination. Note that these are merely examples, and the invention is not to be limited to the shown resolutions, frame rates, and bit rates. After identifying the scalability features, for each combination of spatial, temporal, and bit-rate, the video characteristics source calculates the quality attainable given that combination. The objective is to be able to enumerate the potential video scalability levels given combinations of scalability. The video characteristics source then creates a scalability profile matrix that summarizes the scalability features of the video as a plurality of video scalability levels. FIG. 3 shows a potential embodiment of the scalability profile matrix. The matrix is organized with the rows representing different spatial/temporal combination and columns representing potential bit-rate requirements associated with a given spatial/temporal combination. Each spatial/temporal/bit-rate combination is given a scalability profile index. Next, video quality is calculated for each scalability profile index, and the matrix is populated with this information. In the nonlimiting example shown in FIG. 3, for each spatial/temporal combination, there are four potential scalability profiles ($S_n$), differentiated by bit-rate requirements ($c_n$), where n is the scalability profile index. Additionally, each scalability profile, $S_n$, has a measured or calculated quality value, $q_n$, associated with the profile. As one example video scalability level shown in FIG. 3, $S_{17}$ is a 4 CIF 60 fps profile with bit-rate requirement $c_{17}$ and measured quality value $q_{17}$. The matrix summarizes the scalability properties of the video stream and will be used by the video scaling controller 24. As a nonlimiting example, the quality information can be calculated offline by the server 16 or any other device during the encoding stage and sent with the video stream. Alternatively, a dynamic video quality profiler, which can the same or a separate device from other components, can be used to determine the attainable quality of the scalable profiles, such as but not limited to a realtime quality assessment.

Another component, the video scaling controller and extractor 24, for a new set of incoming requests from the devices 14a-14d, uses the received and monitored inputs from the network and device monitor 20 and the video characteristics source component 22 to determine the scaling level for each of the devices. The scaling levels chosen are dependent on the scaling algorithm's desired service objective. For example, with a user device-centric scaling algorithm, the controller 24 bases the scaling solely on the capabilities of individual devices 14a-14d. On the other hand, for a network cooperative algorithm, the controller 24 considers information about the devices 14a-14d in the network 10, as well as the available network bandwidth and user device channel constraints. Once a scaling level is chosen, the example framework 12 extracts the appropriate scalable video stream from the original stream. Example extractor software methods include, but are not limited to, bit stream extraction, such as but not limited to the method available in Joint Scalable Video Model 6 (JSVM6). Note that the extractor software can support various scaling input parameters, including spatial level, temporal level, and bit rate desired. Further, though example scaling methods use scaling levels, other scaling methods that consider spatial level, temporal level, and/or bit rate can be used according to embodiments of the invention.

Three nonlimiting example scaling algorithms will now be described. The first example scaling algorithm is a user device-centric scheme with the objective of providing the best quality video for a given user based solely on its capabilities and limitations. The latter two example algorithms are suitable for network cooperative systems, where the objective is to improve the overall network performance.

The first of the network cooperative scaling algorithms works with the network's capacity limitation and determines the appropriate scaling for each user in the network based on capacity, device constraint, and expected video quality impact. This algorithm is suitable when the network operator can allocate the required bandwidth for the stream selected by the example framework for the entire duration of the video. However, it may be the case that the network is unable to allocate the required bandwidth or is unable to maintain the bandwidth through the entire video stream due to characteristics of the network, such as the location of the user, channel access scheme, network topology, or channel fluctuations. For this example, a second network cooperative video scaling is provided to handle user channel constraints. This algorithm can be utilized to further improve resource usage and quality satisfaction when network scheduling constraints are known.

Note that since the network cooperative algorithms need information about the network, these schemes are best deployed by network operators. On the other hand, with the user device-centric scheme, only information about the device is needed, and so it can be deployed by both the service provider as well as the network operators.

A more particular example of the three video scaling algorithms will now be described. Consider a wireless network (though, again, other networks may be used with embodiments of the invention) with N clients, each requesting a unique video stream. For each video stream, the set of scalability profiles is given by $S_j$: $[S_{j1}, S_{j2}, \ldots S_{jL}]$, where j indicates the video stream index and L represents the maximum number of scalable profiles available for the stream. The chosen profile for all clients in the network is given by $P:[P_i|i=1:N, P_i \in S_{v(i)}]$, where i is the client index and v(i) is the video for client i. Each scalability profile has a quality, cost, and requirements component. For a given video j and a profile k, these components are given by $S_{jk}$.qual, $S_{jk}$.bw, and $S_{jk}$.req respectively.

For the quality measurement of each profile, $S_{jk}$.qual, there are various subjective and objective metrics that can be used to measure video quality. In experimental operations of methods of the present invention, a quality metric was used that was based on National Telecommunications and Information Administration (NTIA) Video Quality Measurement (VQM), because this metric has been shown to produce quality estimation techniques close to human perception and measures the impact of various quality components. Although VQM is used in example experiments, however, algorithms according to embodiments of the present invention can be used with other metrics, as will be appreciated by those of ordinary skill in the art.

In terms of the profile cost, the focus is mainly on the bandwidth requirement of the profile, $S_{jk}$.bw. However, the algorithm can be extended to reflect costs, such as energy or processing costs, if the total energy and processing resources are known. Additionally, each profile has a requirement component $S_{jk}$.req that is in terms of the profile's spatial and temporal properties.

Again, the objective of a user device-centric scheme is to provide the best video quality for a given user device based solely on its capabilities and limitations. A user device-centric scheme can improve bandwidth efficiency and quality, and is ideal for scenarios where the example framework is working with devices in multiple access networks and network impact is not a concern.

The service objective of an example user device-centric algorithm is to maximize individual quality given device capability constraints. In other words, the goal is to find a set P such that $\forall i \in N\ P_i$.qual=maxQual$_i$, where $P_i$.qual is the quality for the selected scalability profile and maxQual$_i$ is maximum attainable quality of the video stream given the device's capabilities.

The case is considered when the device capability information reflects the maximum supported capabilities, rather than the run-time capabilities given by the current processing load. This can be extended to support run-time processing load by performing periodic updates. To find the appropriate scalability profile, the example algorithm performs a search for each user device to find the highest quality profile that does not exceed the limitations of the device. The example algorithm's complexity is mainly found in sorting the scalability profiles on the quality values and is at most O(N log L). With this algorithm, the suitable scaling profile preferably is extracted prior to delivery over the wireless network, avoiding using network resources unnecessarily. Since this example algorithm is a network independent algorithm, it can be used to support devices in different access networks and requires minimal information from the network access point or base station.

Next are considered methods for a network cooperative system, where the video-scaling framework is able to work with the network resource allocation scheme to improve efficiency and meet network-wide service objectives. The first example network cooperative video scaling method provided is a device and network capacity scaling algorithm. In contrast to the user device-centric algorithm, this algorithm makes use of the available network capacity information and makes a decision considering all the devices in the network.

An example method has a goal of improving the achieved quality and quality satisfaction of each user device in the network. For a user i with a selected video profile $P_i$, the achieved quality is reported as $P_i$.qual. In addition to the quality, an additional metric is considered that can relate the achieved quality with the maximum quality possible given the user device capabilities, which is termed herein the user's quality satisfaction. Quality satisfaction is used as a metric because this metric can relate the achieved quality with the maximum quality possible given the user device capabilities. The quality satisfaction, $QS(P_i)$, is defined as $$QS(P_i) = w * P_i.\text{qual}/\text{maxQual}_i$$

where i is the client index, $P_i$.qual is the quality achieved with the chosen profile, maxQual$_i$ is the maximum achievable quality of user i, and w is the weight factor of the client. In a nonlimiting example method, equal weights are considered, and hence $QS(P_i)$ is defined by the following expression, with N representing the total number of users in the network.

$$QS(P_i) = 1/N * P_i.\text{qual}/\text{maxQual}_i$$

Having described the quality satisfaction of a user, an example service objective of the example algorithm can now be described. The example objective is to maximize the overall quality satisfaction given the network capacity and device constraints. The constraints of the objective are to maintain a minimum quality requirement, ensure that the bandwidth allocated does not exceed the overall network bandwidth, and choose a profile that does not exceed what can be supported by the device. The objective can be expressed by the following equation, where i is the client index, $P_i$ is the selected profile index with $P_i$.bw, $P_i$.qual, and $P_i$.req representing the total bandwidth needed, the quality achievable, and the requirements of the given profile respectively, QS is a function of quality satisfaction as defined above, bwAvail is the total bandwidth available, minQual$_i$ is the minimum required quality guaranteed in the network, max Cap$_i$ is the maximum capabilities of user i, and aggQS is the aggregate quality satisfaction of the network.

$$\max_P aggQS = \sum_{i=1}^{N} QS(P_i)$$

$$\forall\ i \in N\ P_i \cdot qual > minQual_i$$

subject to $$P_i \cdot req \leq maxCap_i$$

and $$\sum_{i=1}^{N} P_i \cdot bw < bwAvail$$

Figure 4:
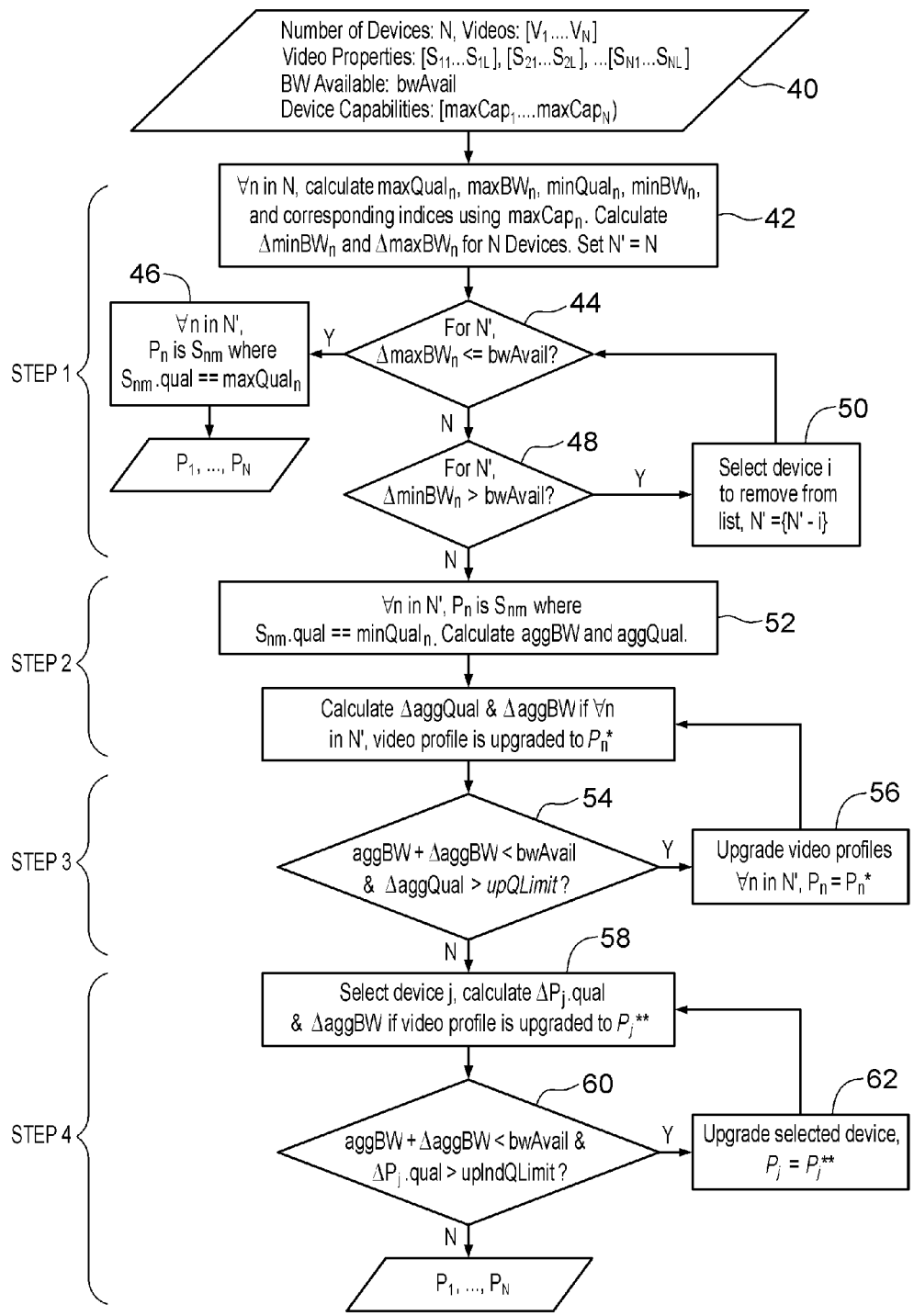
FIG. 4 shows an example video scaling method considering device and network capacity, according to an embodiment of the present invention.

In order to meet the above objective and constraints, a video scaling algorithm is presented that uses an iterative approach to achieve maximum quality satisfaction. FIG. 4 shows a general example scaling algorithm according to a method of the present invention based on an iterative method. The assumed inputs (step 40) to this algorithm are the video stream, information about scalability properties, network bandwidth, and device information, which are gathered by the other components.

Step 1: Using device capability, for each device, calculate maxQual, max BW, minQual, and min BW (step 42). It is then determined (step 44) if the maximum quality obtainable (maxQual$_i$) for each device can be supported. If so, extract (step 46) the device-appropriate stream. If not, select a set of devices in the network such that the minimum quality requirements (minQual$_i$) of each device can be met (step 48). If the minimum quality requirements cannot be met, the device is removed from the list (step 50).

Step 2: If the network is not overloaded, determine potential change in aggregate quality ($\Delta$aggQual) and aggregate bandwidth cost ($\Delta$aggBW) if all video streams are upgraded to a higher scalability profile (step 52). The upgrade can be based on simple bandwidth allocation or on expected quality impact given video scalability properties. Based on device capability information, limit the maximum profile obtainable with these upgrades.

Step 3: Check (step 54) for the following criteria: 1) the potential change in aggregate quality is significant and over a set threshold (upQLimit) and 2) the aggregate bandwidth cost is within the available network bandwidth. If the above criteria are met, upgrade the profiles (step 56) for each device and repeat Step 2 (step 52), considering additional network-wide upgrades.

Step 4: When network-wide upgrades are no longer possible, check to see if it can improve the quality satisfaction of individual devices. Select (step 58) an individual device (j) based on weights to upgrade if bandwidth is still available and calculate the potential impact on individual quality ($\Delta P_j$.qual) and cost of the upgrade. If the upgrade is possible (step 60) given the device capabilities and network constraints, upgrade (step 62) the scalability level and repeat until no additional upgrades are possible.

By the end of the process, the example device and network-aware scaling method is able to select streams that maximize the aggregate quality satisfaction of the network. The algorithm ensures a minimum quality for each video stream, performs network-wide upgrades for fairness, maintains bandwidth by not exceeding device limitations, and stays within the network bandwidth limitations.

In the network cooperative method described above, the video scaling algorithm determines the appropriate video scaling for each of the devices in the network and assumes that the network access point or base station is able to allocate the necessary bandwidth for each user. However, depending on user location, technology (e.g., wireless technology), channel access scheme, physical layer limitations, and network topology, a network access point or base station may be unable to provide the necessary bandwidth to a particular user device. For example, in the case of IEEE 802.11 b/a/g, maximum link layer throughput is dependent on the distance from the AP, and hence devices farther away may not be able to achieve the desired throughput. Additionally, since channel access in 802.11 networks is distributed, the achievable bandwidth per device is dependent on the number of devices sharing the channel at any time. The recent IEEE 802.11e provides some bandwidth guarantees with Hybrid Coordination Function Controlled Channel Access (HCCA), but depending on the available resources, the bandwidth reserved for a user may be less than the required bandwidth.

Additionally, it can be the intent of the network scheduler to limit the achievable data rate of each user to meet additional service objectives. For example, the maximum achievable data rate of each user would be limited if the network wanted to ensure equal or proportional bandwidth allocation to the devices to achieve fairness. Alternatively or additionally, service objectives may be modified or customized based on service agreements (e.g., with a user or a content provider), creating a tiered system of content delivery under access plans.

Figure 5:
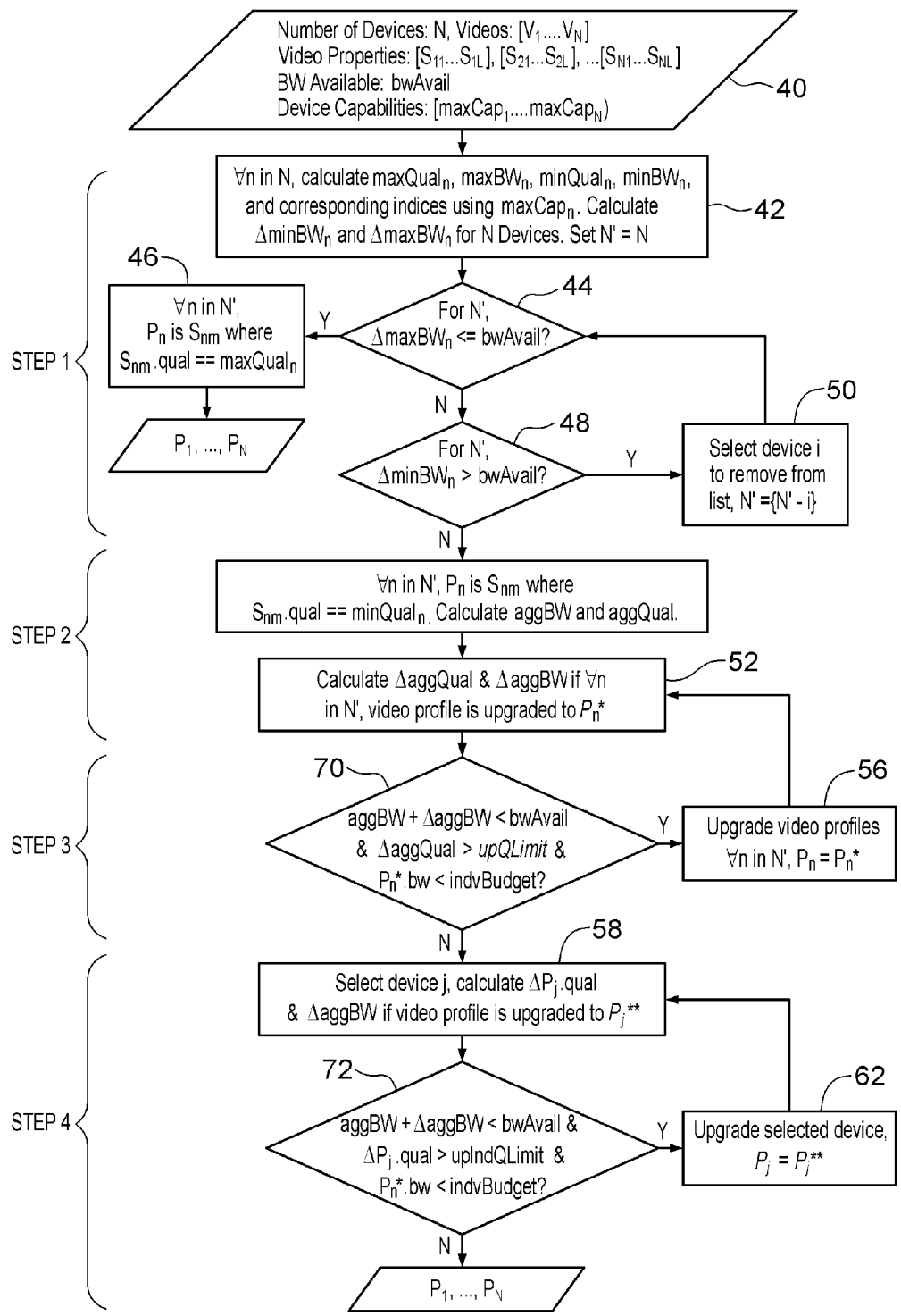
FIG. 5 shows another example video scaling method considering device and network capacity along with user channel constraints, according to another embodiment of the present invention.

To incorporate these constraints and make better decisions about the scalability of each device, another example method of the present invention includes individual channel limitations. Generally, the extent of the scaling upgrade is restricted based on the individual user channel limitations, and video streams with greater requirements that what can be handled by the user device and network constraints are prevented. To handle these user channel limitations, the method shown in FIG. 4 is modified in Steps 3 and 4 to upgrade the video scaling levels. This modified method is shown in FIG. 5. Particularly, step 70 considers the potential change in aggregate quality is significant and over a set threshold (upQLimit) and the aggregate bandwidth cost is within the available network bandwidth before upgrading, as in step 54, but further considers whether the selected upgrade exceeds the available bandwidth for the particular user, $P_n^*.bw<$indvBudget. Similarly step 72 considers whether bandwidth is still available and the potential impact on individual quality ($\Delta P_i$.qual) and cost of an upgrade before upgrading, as in step 60, but further considers whether the selected upgrade exceeds the available bandwidth for the particular user, $P_n^*.bw<$indvBudget.

By scaling based on known channel limitations, particular example methods of the present invention can improve the quality achieved across the network and provide higher quality videos only to the users that are capable of viewing them. This example method has a significant impact on both quality satisfaction and individual quality. Note that the method shown in FIG. 5 assumes the condition of the channel remains static over the duration of the video stream. In the case where the channel conditions fluctuate, a re-evaluation of the situation can be made periodically to adjust to the channel changes.

Experimental Results

Experiments were conducted using example methods of the invention. Example methods and results are provided below. However, it is to be understood that the present invention is not to be limited to the particular methods, networks, devices, video content, video characteristics (resolutions, frame rates, bit rates, quality, etc.), codecs, software, and/or results described and shown herein.

For experiments using example methods of the present framework and video scaling algorithm, the video scaling algorithms for the video scaling controller were tested. For the scalable video encoding, decoding, and extraction of streams, the JSVM6 Scalable Video Coding Software was used. Due to the limitations of the JSVM6 encoder, the spatial scalability was limited to CIF and a temporal scalability of up to 30 frames per second was supported. With these spatial and temporal limitations for the requested video stream, networks, such as WLAN or cellular networks, with capacity up to 5.5 Mbps, were considered. However, example embodiments of the present invention will be applicable to higher levels of scalability and in networks with higher network capacity. Three different video sequences are considered: BUS, FOREMAN, and AKIYO.

The average quality experienced by users in the network was reported, as well as the aggregate quality satisfaction. The NTIA's Video Quality Metric (VQM) was used as the basis of the video quality metric. VQM has been shown to produce quality estimation techniques close to human perception and is able to measure the impact of various quality components, including temporal characteristics. To make the quality metric more intuitive, the video quality level is reported using the following definition: QL=1−VQM, where QL=1 signifies the highest quality with no distortion and QL=0 signifies the lowest quality. Hence, each user i with a given profile $P_i$ experiences a quality $P_i$.qual measured in QL. In scenarios with multiple users, the average quality for the users was reported. The value of avgQ is given by the following expression, with i representing the user, $P_i$.qual being measured using QL, and N representing the total number of users in the network.

$$avgQ = (1/N) * \sum_{i=1}^{N} P_i \cdot qual$$

In addition to average quality, a quality satisfaction metric is also assessed, which considers the achieved quality in relation to the maximum achievable quality for each device. Quality satisfaction is considered because it is able to reflect whether the quality level achieved by the user is acceptable given the user device's capabilities. Again, aggregate quality satisfaction is given by aggQS=$\sum_{i=1}^{N}$QS($P_i$), where QS=(1/N)*($P_i$.qual/maxQual$_i$), and $P_i$.qual and maxQual are the achieved and maximum quality measured in QL for user i.

User Device-Centric Video Scaling

First, the user-device scaling algorithm is considered. The user-scaling algorithm selects the correct profile using the maximum capabilities of the device. Consider the scenario described above, where three sets of devices in a network are provided, with the viewing capability translating to CIF 30, CIF 15, and QCIF 15. It is assumed that each device is requesting one BUS video stream and a basic admission control is used to limit the number of devices in the network based on the bit rate needs of the stream. In this scenario, the AP is able to allocate the needed bandwidth to each device, and the only limitations considered are the device and network capacity constraint of 5.5 Mb/s.

FIG. 1 shows the benefits of an example algorithm according to embodiments of the present invention in terms of bandwidth efficiency using the device-aware algorithm. In comparison to SVC, the example device-aware algorithm reduces bandwidth usage by 42%.

Figure 6:
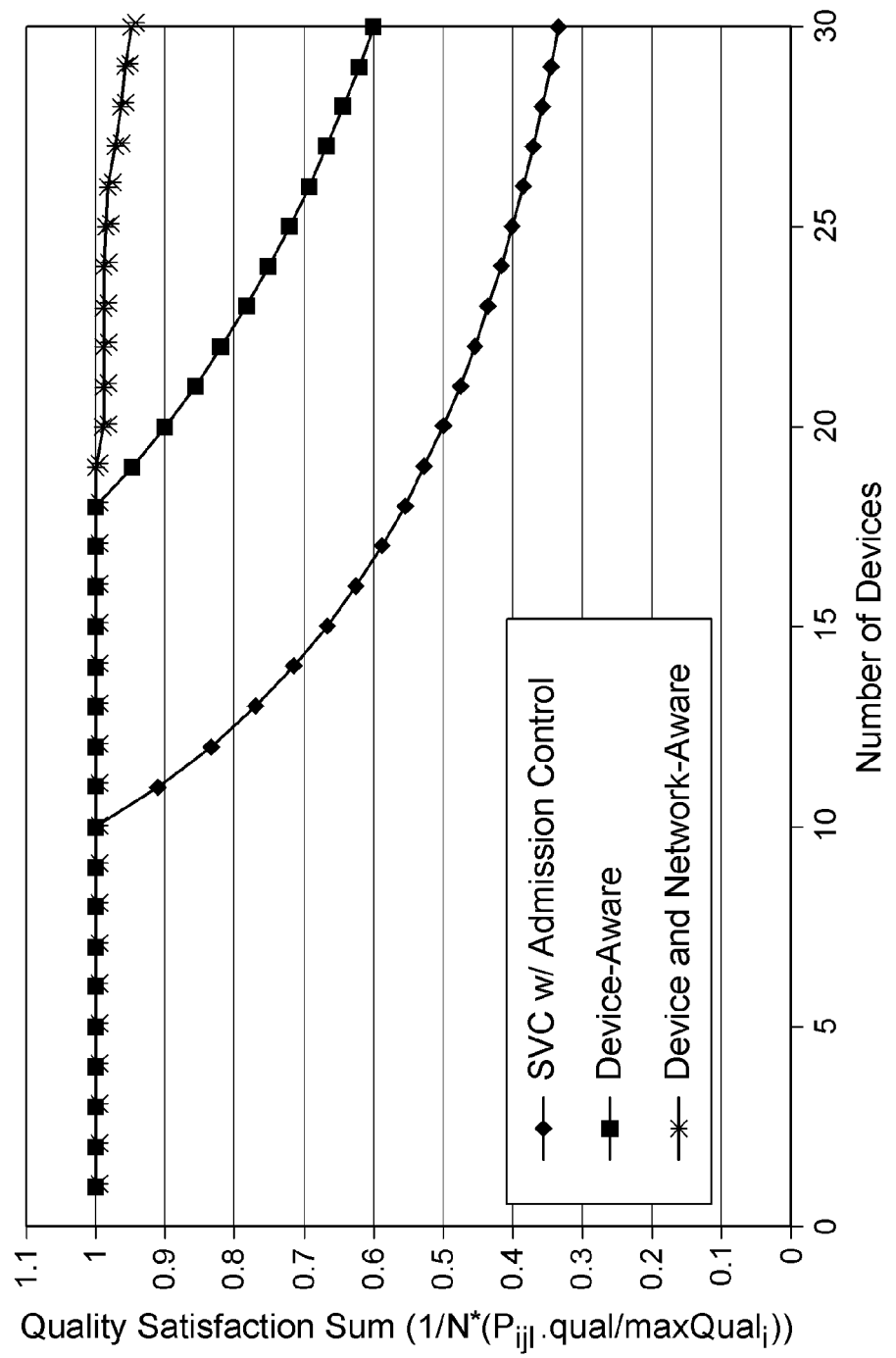
FIG. 6 shows aggregate quality satisfaction for SVC, example device-aware video scaling, and example device and network-aware video scaling for different numbers of user devices.

Next, the impact of an example method of the present invention on the aggregate quality satisfaction ratio aggQS (the average ratio of achieved quality versus the maximum achievable quality of the devices) is considered. As shown in FIG. 6, aggQS is high when the number of devices in the network can be fully supported. However, as the number of users increases beyond the maximum number of devices supported, the aggQS decreases significantly with SVC, and the device-aware scheme, because some devices are left unserved. The device-aware scheme, however, fares better than SVC, with quality satisfaction at 0.60 with 30 devices versus the 0.33 achieved with SVC.

Figure 7:
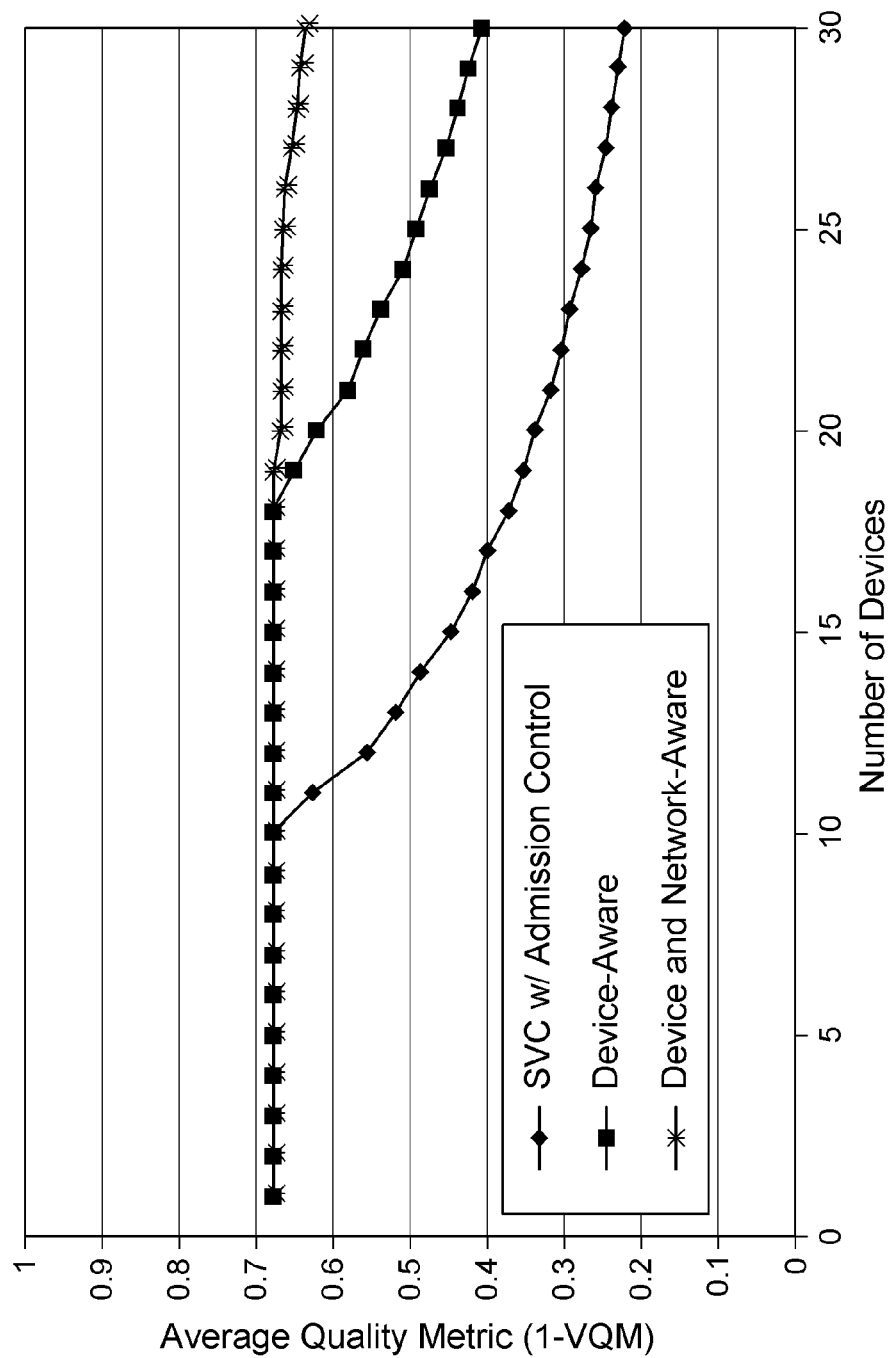
FIG. 7 shows average experienced quality for SVC, example device-aware video scaling, and example device and network-aware video scaling for different numbers of user devices.

Next, the average achieved quality, avgQ, is considered in the network with the various schemes as the number of devices increases, as shown in FIG. 7. As the number of users increases beyond the maximum number of devices possible with SVC and for the device-aware scheme, the average achieved quality of the network degrades heavily, because some devices are left unserved. The device-aware scheme, however, fares better than SVC, with the average quality metric at 0.41 with 30 devices versus the 0.22 average quality level experienced with SVC. These results indicate that the user device-centric scheme is able to improve over SVC in terms of bandwidth, quality satisfaction, and experienced quality.

Network Cooperative Video Scaling

Results using the network cooperative video scaling schemes are discussed next, including scaling using network capacity information and incorporating user channel information. Again, when considering network capacity information, the example method's objective is to maximize aggregate quality satisfaction based on the constraints of the device as well as the available network bandwidth.

Consider the scenario described above, having an equal distribution of user devices requesting the BUS video. FIG. 1 shows that in a scenario with an equal distribution of devices, the device and the network capacity-aware algorithm reduces bandwidth usage by up to 64%. In terms of aggregate quality satisfaction, aggQS, one can maintain an aggregate quality satisfaction of 0.95 with 30 devices and outperform SVC. By using network capacity information as well as device information, it can be seen that more devices are able to access the network and achieve a satisfactory quality. Similarly, considering the avgQ of the device and network capacity-aware algorithm, it can be seen that the example algorithm achieves the highest average quality obtainable in this scenario, achieving a 0.65 average quality level at 30 users as seen in FIG. 7.

After considering a scenario with an equal distribution of devices, the example device and network-aware scaling algorithm is evaluated over multiple test cases. For these experiments, a set of test cases are reviewed, changing the scenario characteristics by changing the number of devices, varying the device capabilities by choosing different capabilities for each user for each test case, and considering three different video sequences; AKIYO, BUS, and FOREMAN.

Table 1 below summarizes the results of these experiments. Each row represents the average of five test cases with a given video stream and number of devices combination. Table 1 reports the number of devices supported in the network, the average quality score, and the aggregate quality satisfaction over the five runs. In the experiments with SVC, a favorable admission control policy is assumed, which serves the devices with the highest achievable quality.

TABLE 1

| Video Name and Number of Devices | Number of Devices Served | | Average Experienced Quality | | Aggregate Quality Satisfaction | |
| --- | --- | --- | --- | --- | --- | --- |
|  | SVC | DeNAS | SVC | DeNAS | SVC | DeNAS |
| Bus-10 | 10 | 10 | 0.670 | 0.670 | 1.00 | 1.00 |
| Bus-20 | 10 | 20 | 0.383 | 0.619 | 0.500 | 0.920 |
| Bus-30 | 10 | 30 | 0.263 | 0.617 | 0.333 | 0.927 |
| Foreman-20 | 20 | 20 | 0.638 | 0.638 | 1.00 | 1.00 |
| Foreman-30 | 21 | 30 | 0.462 | 0.645 | 0.700 | 1.00 |
| Foreman-40 | 21 | 40 | 0.353 | 0.619 | 0.525 | 0.965 |
| Akiyo-20 | 20 | 20 | 0.882 | 0.882 | 1.00 | 1.00 |
| Akiyo-30 | 21 | 30 | 0.625 | 0.854 | 0.700 | 0.964 |
| Akiyo-40 | 21 | 40 | 0.477 | 0.834 | 0.525 | 0.944 |

First, the number of devices that can be supported in the network are considered given the different scaling methods.

Table 1 shows that the example scaling algorithm is able to support a greater number of devices in the network across all the test cases. In the particular combination of the BUS video stream with 30 users, the maximum improvement of 3× is observed, with only 10 users supported with SVC, as compared to 30 users with the example scaling algorithm using network capacity.

Next, the average quality, avgQ, achieved in the different scenarios, are evaluated. While the avgQ is similar in the cases where the number of devices is small, an example scaling algorithm according to the invention achieves a significantly higher average quality improvement over SVC in the cases where there are a greater number of user devices. Additionally, a similar trend is observed with the aggregate quality satisfaction in the different scenarios, because more user devices are able to access the network and are satisfied with example scaling algorithms of the present invention. While the quality satisfaction and achieved quality for SVC deteriorates with more devices, an example scaling method of the present invention scales well with increasing number of devices, with minimum degradation in quality satisfaction and average quality experienced. Such an example algorithm is able to achieve a quality satisfaction score in the range of 0.92-1, while the quality satisfaction using SVC is as low as 0.33 with the BUS stream. In all cases, example scaling algorithms of the present invention are able to achieve high quality satisfaction, while maintaining the minimum quality requirement.

Device and Network-Aware Scaling Using User Channel Constraints

Next, the performance of example scaling algorithms of the present invention are considered in the case where there are channel limitations for individual users. In the previous scenarios, the scaling decision is made assuming that the access point is able to provision the necessary bandwidth for each user. However, as explained above, this may not always be possible due to various reasons, including channel conditions resulting from distance and topology, as well as the wireless network's channel access scheme.

TABLE 2

| Type & | Aggregate Quality Satisfaction | | |
| --- | --- | --- | --- |
| Number of Devices | SVC | DeNAS using Network Capacity Information | DeNAS using User Channel Information |
| ALL-15 | 0.750 | 0.997 | 0.998 |
| ALL-20 | 0.500 | 0.983 | 0.997 |
| ALL-25 | 0.400 | 0.982 | 0.996 |
| ALL-30 | 0.333 | 0.991 | 0.997 |
| LAP-15 | 0.750 | 0.963 | 1.00 |
| LAP-20 | 0.500 | 0.952 | 1.00 |
| LAP-25 | 0.400 | 0.976 | 1.00 |
| LAP-30 | 0.333 | 0.985 | 1.00 |

An example scaling algorithm according to embodiments of the present invention can improve the chosen scaling levels for each user by ensuring the chosen scalability can be supported by the device's capabilities, as well as their channel limitations. To show the impact of this algorithm, an example scaling algorithm according to the present invention was evaluated using channel information, and improvement in network quality satisfaction was observed. For these experiments, topologies of 15, 20, 25, and 30 devices were considered, where each of the devices is requesting the BUS video and the maximum capacity is 5.5 Mb/s. For each network topology, 20 test runs were performed to vary the maximum achievable bandwidth of each user in a given network. Table 2 and Table 3 summarize the results of these experiments, where each row represents results with a topology for a fixed number of users. Table 2 provides the achieved quality satisfaction with SVC, with an example scaling algorithm of the present invention using network capacity information, and with an example scaling algorithm of the present invention using user channel information. Additionally, Table 3 summarizes the maximum improvement of an individual user achieved by an example scaling algorithm using channel information is given in terms of the quality metric QL, and the corresponding percentage improvement. Recall that the quality satisfaction score is the ratio between the quality of the received video over the maximum achievable quality. The maximum achievable quality is adjusted to reflect the user channel impairments.

TABLE 3

| | Maximum User Improvement | | | |
| --- | --- | --- | --- | --- |
| Type & | QL (VQM-based) | | QL (PSNR-based) | |
| Number of Devices | Qualify Difference | Percentage | Quality Difference (dB) | Percentage |
| ALL-15 | 0.07 | 10.14% | 0 | 0% |
| ALL-20 | 0.16 | 24.24% | 2.86 | 10.52% |
| ALL-25 | 0.16 | 25.40% | 7.21 | 32.27% |
| ALL-30 | 0.13 | 20.63% | 6.03 | 27.08% |
| LAP-15 | 0.13 | 18.84% | 2.86 | 10.52% |
| LAP-20 | 0.17 | 26.15% | 4.91 | 22.05% |
| LAP-25 | 0.16 | 25.40% | 7.28 | 32.69% |
| LAP-30 | 0.13 | 20.63% | 6.16 | 27.28% |

In the first set of experiments, an even distribution of all three devices (laptop, PDA, and cellular phone) in the network is assumed. These experiments are labeled as ALL in the results. First, the quality satisfaction scores are considered, with SVC, example scaling algorithms of the present invention using only network capacity information, and example scaling algorithms of the present invention using channel information. In all of the scenarios, example scaling algorithms of the present invention based on network capacity information continue to outperform SVC even with the user channel limitations. Next is considered the improvements that can be achieved using channel information. As seen from the quality satisfaction scores, the majority of users are able to reach their maximum achievable quality given their channel and device limitations with example scaling algorithms of the present invention using user channel information. While the quality satisfaction score shows improvement over the entire network, individual users are reviewed next, and the maximum improvement achieved with a single user in these scenarios is considered. As can be seen in Table 2, the potential impact for a single user can be significant. For example, in the case of 25 devices, the maximum user improvement is 0.16, when a laptop originally obtaining a VQM-based quality of 0.63 is able to improve its quality up to a 0.79. This is approximately a 25% improvement in the laptop's experienced quality. The quality impact is also calculated using PSNR as the quality metric. The columns of Table 3 show the maximum individual user improvement measured in PSNR for the discussed scenarios. The maximum individual user improvement with example scaling algorithms of the present invention using channel information is 7.21 dB in the case of 25 users.

In a next set of experiments, scenarios are considered where the bandwidth demand is higher and when all the devices are laptops. Similar scenarios are considered to the above experiments with 15, 20, 25, and 30 devices, and 20 test runs are performed to vary the maximum achievable data rate of each device. These results are also shown in Table 2, and are labeled as LAP in the table. As can be seen in the quality satisfaction scores, the example scaling algorithms of the present invention using network capacity information outperforms SVC. Since the devices have higher bandwidth needs, the quality satisfaction scores are slightly lower than the previous results.

Example scaling algorithms of the present invention using user channel information are next considered. The results indicate that such algorithms are able to improve the quality satisfaction score to almost 1, meaning that the majority of devices can reach their maximum achievable quality. Finally, in terms of the maximum individual quality improvement using example scaling algorithms of the present invention using channel information, Table 3 shows results similar to the previous scenarios with a VQM-based quality metric improvement of 0.17, approximately 25%, and a PSNR maximum improvement of 7.28 dB.

Figure 8:
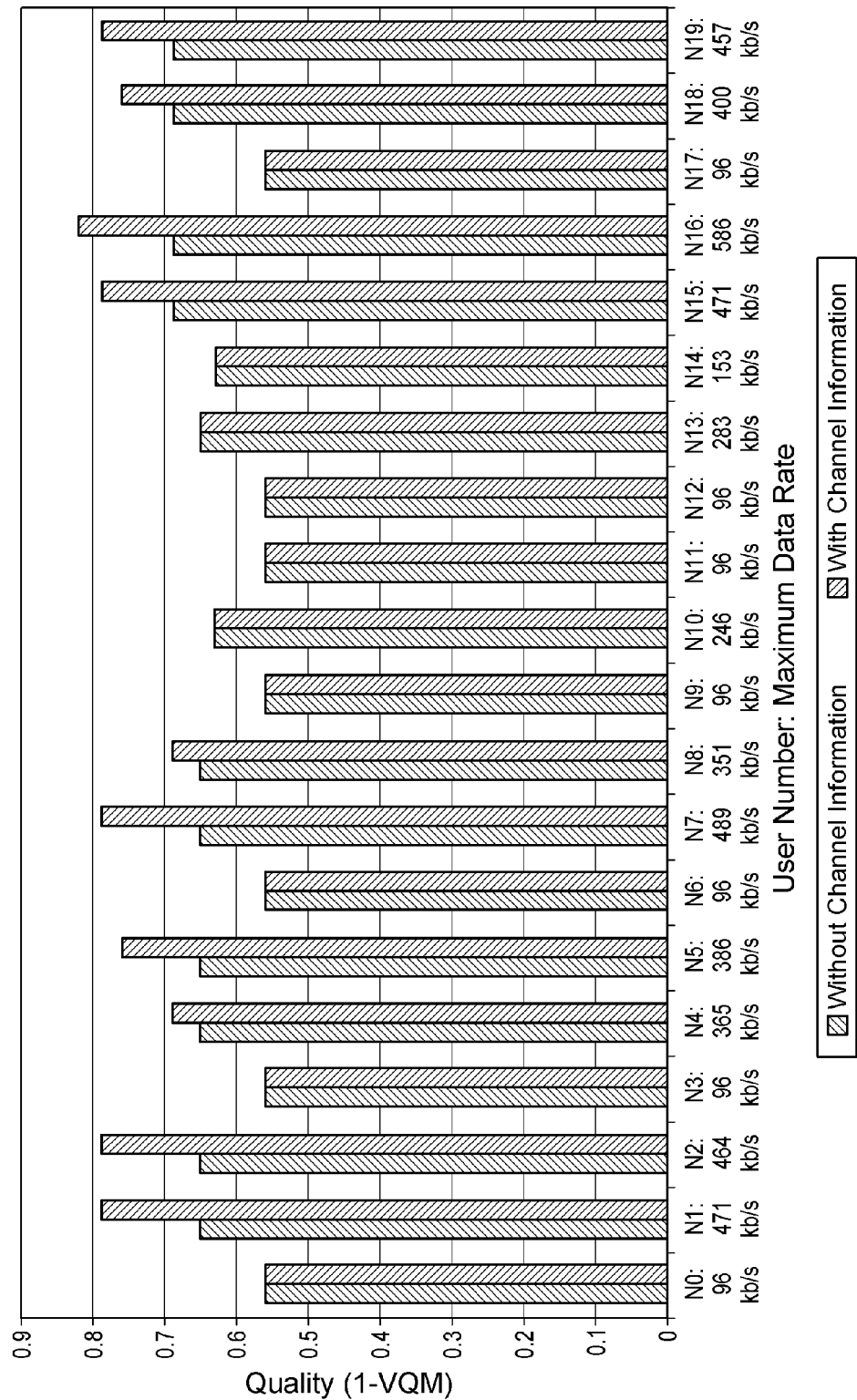
FIG. 8 shows a distribution of improvement in experienced quality based on a VQM metric with example methods of the present invention using network capacity versus example methods of the present invention using user channel information, for a 20 device scenario.
Figure 9:
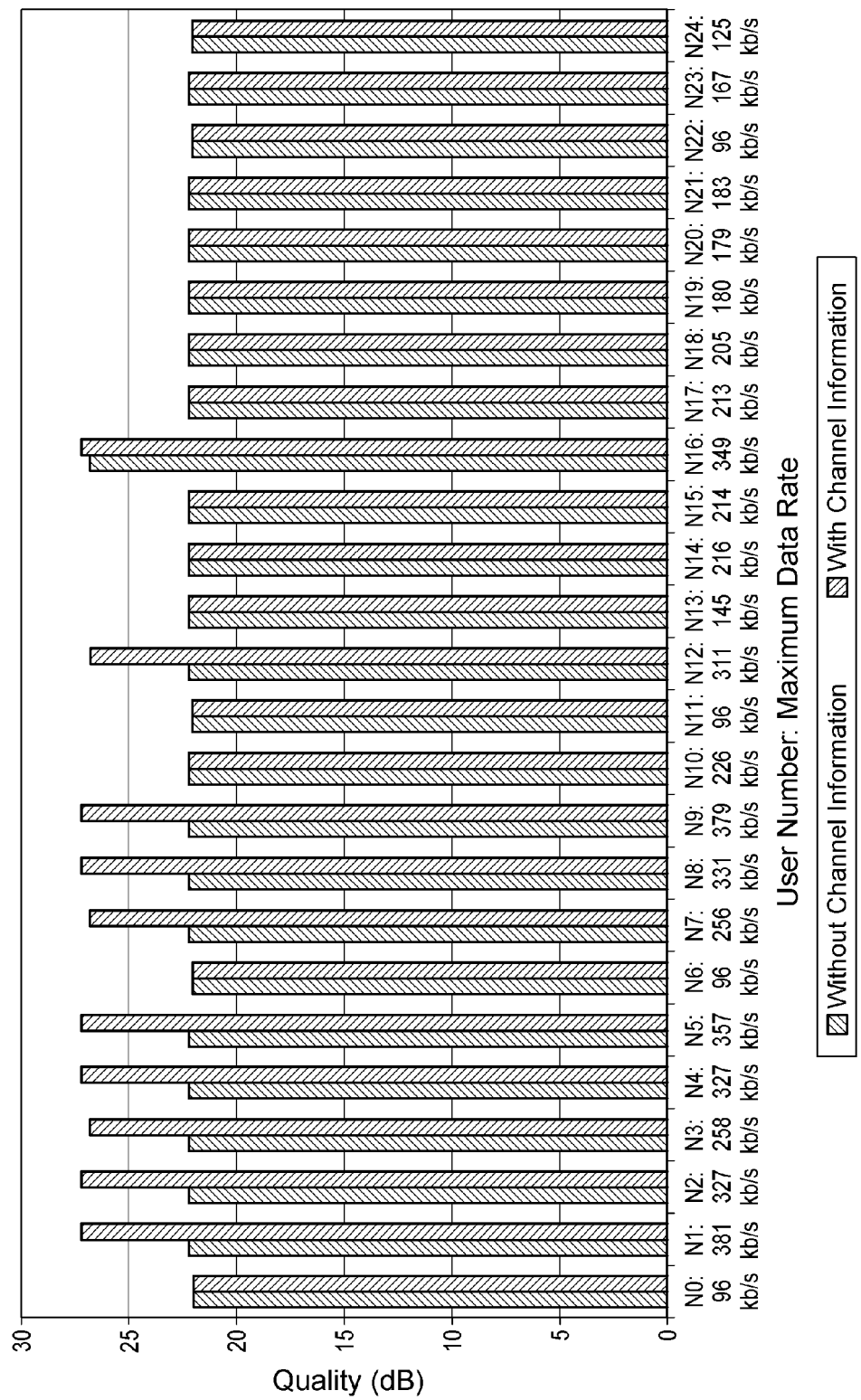
FIG. 9 shows distribution of improvement in experienced quality (PSNR) with example methods of the present invention using network capacity versus example methods of the present invention using user channel information for a 25 device scenario.

Next is shown the quality experienced by the devices measured using the VQM-based quality metric QL in a chosen scenario to illustrate how the quality improvement is distributed over the network. FIG. 8 shows the LAP-20 scenario, where algorithms according to embodiments of the present invention are able to achieve the maximum improvement in quality satisfaction using additional channel information. The X axis provides the user number for the 20 devices and their maximum achievable data rate. The Y axis shows the VQM-based quality metric experienced. For each device, the experience quality is compared with example embodiments of the present invention using network capacity versus scaling using channel information. As can be seen in FIG. 8, many of the individual devices, such as N1, N2, and N4, are able to experience significantly higher quality video when additional channel information can be used to determine video scaling. When the quality of each profile is measured in PSNR, example scaling methods of the present invention are able to achieve the maximum improvement in quality satisfaction in the LAP-25 scenario. FIG. 9 shows the quality impact in this scenario of using channel information with example scaling methods of the present invention. Many of the individual user devices, such as N1, N2, and N4 are able to achieve a significant improvement of up to 5 dB when user channel information is considered.

Evaluating in a WLAN Network

Next, example scaling algorithms of the present invention are evaluated in a simulated WLAN environment. For these experiments, the Opnet tool was used to simulate an IEEE 802.11b environment. Rather than choose a default packet distribution to represent the video stream, actual packet traces of the SVC encoded video stream were incorporated, and the scaled video streams were created by an example inventive framework to provide a more accurate application load in the simulations. The packet traces of the scalable video streams were incorporated into the Opnet Application and Profile configuration. In the experiments, the default simulation parameter settings were considered for an 11 Mb/s IEEE 802.11b network, and it was assumed that no admission control scheme is used for the network. The number of users was varied from 10 to 20 with an equal distribution of laptops and PDAs, and a 20 second looped sequence of the BUS video was used for the video sequence. To assess the quality of the video received at the user device, after each simulation, the experiment used the set of successfully received packets over the simulated network and reconstructed the video that would be viewed given the device's capabilities.

The results from this set of simulations show that the use of SVC can lead to serious congestion problems in the network. As the number of devices increases, the observable delay experienced by each device increases significantly with SVC and the device-aware scheme, in comparison to algorithms according to example embodiments of the present invention. The delay observed is dependent on the setting of the number of nodes in the network, the AP buffer size, and the amount of background traffic. As the number of devices in the network increased, the AP experiences large delays, collisions, and retransmissions because of the contention-based medium access control used in 802.11. For example, in the case of 20 devices, devices are only able to receive one viewing of the video with SVC but are able to observe more than two full viewings of the looped video with example scaling algorithms of the present invention. Hence, the delay with example scaling algorithms of the present invention is 2× greater with SVC due to the amount of traffic the AP has to handle. Additionally, in the test cases where the SVC traffic overloaded the 2 MB AP buffer, several SVC streams suffered from significant packet loss, making the video stream undecodable. By contrast, example algorithms according to the present invention were able to support 20 devices comfortably without any packet loss and significantly alleviate the load of the network.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

The invention claimed is:

1. A method of communication over a network comprising:
   receiving a request for video data for each of a plurality of devices;
   obtaining, for each of the devices, performance capability of the device;
   obtaining network information;
   determining a video scalability level for the video data for each of the devices based on said obtained performance capability and said obtained network information;
   scaling the video data for each of the devices according to said determined video scalability level; and
   delivering the scaled video data to each of the devices;
   wherein said obtaining network information comprises obtaining an available network bandwidth;
   wherein said determining a video scalability level comprises determining a video scalability level for each device that maintains a minimum quality requirement for each device, does not exceed a maximum capability of each wireless device, and does not cause an allocated bandwidth to exceed said obtained available network bandwidth; and
   wherein said determining a video scaling level further comprises:
   for at least one of the devices, determining if upgrading the video scalability level would cause said obtained available network bandwidth to be exceeded and if upgrading the video scalability level would improve quality of the video data by at least a predetermined threshold; and
   upgrading a video scalability level for at least one of the devices if it is determined that upgrading the video scalability level would not cause said obtained available network bandwidth to be exceeded and if upgrading the video scalability level would improve quality of the video data by at least a predetermined threshold.

2. The method of claim 1, wherein the devices comprise wireless devices.

3. A method of communication over a network comprising:
receiving a request for video data for each of a plurality of devices;
obtaining, for each of the devices, performance capability of the device;
obtaining network information;
determining a video scalability level for the video data for each of the devices based on said obtained performance capability and said obtained network information;
scaling the video data for each of the devices according to said determined video scalability level; and
delivering the scaled video data to each of the devices;
wherein said obtaining network information comprises obtaining an available network bandwidth;
wherein said determining a video scalability level comprises determining a video scalability level for each device that maintains a minimum quality requirement for each device, does not exceed a maximum capability of each wireless device, and does not cause an allocated bandwidth to exceed said obtained available network bandwidth; and
wherein determining a video scaling level further comprises:
for at least one of the devices, determining if upgrading the video scalability level would cause said obtained available network bandwidth to be exceeded, determining if upgrading the video scalability level would improve quality of the video data by at least a predetermined threshold, and determining if upgrading the video scalability level would exceed a channel limitation for the at least one of the devices; and
upgrading a video scalability level for at least one of the devices if it is determined that upgrading the video scalability level would not cause said obtained available network bandwidth to be exceeded, if upgrading the video scalability level would improve quality of the video data by at least a predetermined threshold, and if upgrading the video scalability level would not exceed a channel limitation for the at least one of the devices.

4. The method of claim 3, wherein said obtaining performance capability comprises, for each of the devices:
determining a device type; and
determining the performance capability based on said determined device type.

5. The method of claim 3, wherein said obtaining network information comprises:
querying a network component to determine the network bandwidth.

6. The method of claim 3, wherein said obtaining network information comprises:
obtaining current channel information directly from the plurality of devices.

7. The method of claim 3, wherein the video data is scalable over a plurality of video scalability levels, and further comprising:
determining quality for each of the plurality of video scalability levels.

8. The method of claim 7, wherein each of said plurality of video scalability levels is defined at least by a video resolution and a frame rate.

9. The method of claim 7, wherein each of said plurality of video scalability levels is defined at least by a video resolution, a frame rate, and a bit rate.

10. The method of claim 9, wherein said determining a video scalability level comprises selecting, for each of the devices, one of the plurality of video scalability levels.

11. The method of claim 3, wherein the devices comprise wireless devices.

12. A method for scalable video delivery over a network, comprising:
gathering information about capabilities of a plurality of devices to receive video delivery by determining what type of device is requesting video and obtaining information about the device's resolution, frame rate, and bit rate;
obtaining available network bandwidth;
for a video being requested by at least one of the plurality of devices, determining scalability level profiles, attainable quality for each profile, and associated cost for each profile;
selecting a video scalability level to achieve a service objective based on said attainable quality and associated cost;
scaling the requested video based on said selected video scalability level; and
delivering the scaled video to the at least one device over the network.

13. A method of communication over a network comprising:
receiving a request for video data for each of a plurality of devices;
obtaining, for each of the devices, performance capability of the device;
obtaining network information;
determining a video scalability level for the video data for each of the devices based on said obtained performance capability and said obtained network information by maximizing quality obtainable for individual devices constrained by minimum quality for each of the individual devices and by maximizing overall quality for all of the plurality of devices:
scaling the video data for each of the devices according to said determined video scalability level; and
delivering the scaled video data to each of the devices,
wherein said determining a video scalability level comprises determining, for each device, maximum quality obtainable and whether the maximum quality for each device can be supported, and if it can be supported then setting scaling according to the maximum quality obtainable for each device;
if maximum quality cannot be supported for all devices, then select a set of devices for maximum quality such that minimum quality can be met for all devices;
periodically checking, when the network is not overloaded, the potential change in aggregate quality and aggregate bandwidth cost if all video streams are upgraded to a higher scalability profile, and setting a network upgrade if the aggregate quality change is over a predetermined threshold and the bandwidth costs is within network bandwidth;
and when network upgrades are no longer possible, setting individual devices to higher scalability profile if an individual quality change is over a predetermined threshold and the bandwidth cost is within network bandwidth, and continuing setting individual devices to higher scalability profiles until further changes are outside the network bandwidth.

* * * * *